MELVIN SEYMOUR COOK
*INVENTOR.*

United States Patent Office 3,556,629
Patented Jan. 19, 1971

---

3,556,629
METHOD FOR PRODUCING HOLOGRAMS UTILIZING PHOTOCHROMIC MATERIAL AND PHOTOSENSITIVE MATERIAL
Melvin Seymour Cook, Kings Park, N.Y., assignor to Holobeam, Inc., Paramus, N.J., a corporation of Delaware
Filed July 28, 1967, Ser. No. 657,475
Int. Cl. G02b 27/22
U.S. Cl. 350—3.5                              6 Claims

ABSTRACT OF THE DISCLOSURE

This invention is an apparatus and system for photography. Radiation from a scene is imaged by an absolute instrument such as a Maxwell fish-eye. Optical density in the image region is altered by the imaged radiation and such subsequent processing as may be required to develop and fix the image. One portion of a laser beam is used to illuminate the image in the fish-eye and the other portion is sent to a photographic plate where it forms an interference pattern with radiation scattered from the image in the fish-eye. The interference pattern of radiation exposes the photographic plate. The exposed photographic plate when subjected to such processing as may be required to develop and fix the exposure is a hologram of the original scene viewed by the absolute instrument.

---

This invention relates to apparatus for and methods of photography. An image of a scene is formed by an absolute instrument. When required, this image is developed and fixed in the absolute instrument which has incorporated photosensitive material. This image is then illuminated by radiation split from a laser beam. Radiation scattered from this image is caused to interfere with the other portion of the laser beam on the surface of or within the volume of a photographic plate. This exposure when further processed as required constitutes a hologram of the scene.

Prior art techniques for forming holograms of scenes are inconvenient in that elaborate equipment is required when the original exposure is made or else significant information of the scene is lost. The result of the various difficulties in prior art techniques for forming holograms has been that the making of holograms has been restricted to the highly adept using elaborate equipment. The instant invention represents a definite advance in the art in that it allows holograms to be formed from exposures made using an apparatus and system which is susceptible to use by amateur photographers with the hologram being formed subsequently from the exposure.

One object of the present invention is to provide a method of forming holograms using simple and convenient cameras.

An additional object of the present invention is to provide apparatus for performing the method of the present invention.

The present invention is based upon the following considerations.

An optical system which images stigmatically a three-dimensional scene is called an absolute instrument. An example of an absolute instrument is presented by a sphere of radius $a$ whose refractive index is given by the spherically symmetrical refractive index function:

$$n(r) = \frac{n_0}{1+(r/a)^2} \quad (1)$$

where $r$ denotes distance from a fixed point 0, $n_0$ and $a$ are constants, and $n(r)$ is the refractive index at a point of the sphere a distance $r$ from 0. Such an instrument is known as a "fish-eye" and was first investigated by Maxwell (J. C. Maxwell, Cambridge and Dublin Math. J., 8 (1854), p. 188).

All rays of radiation originating at a point $P_0$ outside a fish-eye meet at a point $P_1$ within the fish-eye, where $P_1$ lies on the straight line joining $P_0$ to 0; $P_0$ and $P_1$ lie on opposite sides of 0 and the distances $\overline{OP_0}$ and $\overline{OP_1}$ obey the relation:

$$(\overline{OP_0})(\overline{OP_1}) = a^2 \quad (2)$$

The present invention can be illustrated by examining its functioning with a fish-eye type of absolute instrument.

For use in the instant invention, the fish-eye must have distributed within it in the imaging region of interest one or more photosensitive materials. This can be accomplished in the fish-eye by forming the imaging area of interest of a material such as photochromic glass, for example.

One type of photochromic glass which could be used is basically a borosilicate glass containing silver halide crystallites. While many other types of photochromic materials are known and have been investigated, this photochrome glass shows little or not fatigue in its reversibility or power to undergo phototropic change with repeated exposures. This is of interest since it may be expected that fabrication of the fish-eye will prove an expensive process. These photocromic glasses may be reverse by application of heat, known as thermal fading, or by exposure to long wavelength light, known as optical bleaching. The size and concentration of the silver halide crystallites embedded in the glass matrix of photochromic glass determines not only the photocromic property but also whether the unexposed material is transparent, translucent, or opaque. For purposes of the present invention, it is most desirable that the unexposed material be transparent. This type of photochromic material which is transparent in the bleached condition contains about $4 \times 10^{15}$ crystallites per cubic centimeter with the crystallite sizes being in the range of 50 to 100 angstroms in diameter. The glass loses its photochromic properties when the crystallite diameter is below this range of diameters and the crystallites cause scattering of light when they are above 300 angstroms in diameter.

Light imaged in photochromic glass in a fish-eye causes silver to separate from the halogens. However, in the particular photochromic glass described, the released halogens are confined by the host glass matrix to the immediate vicinity of the crystallites. This confinement is the source of the reversibility of the photochromic glass since recombination of separated silver and halogens can occur by exposure of the glass to heat or by optical bleaching.

The silver thus released upon exposure of a fish-eye with photochromic glass of the variety described in the region of imaging forms an image of the scene viewed by the fish-eye during the exposure.

Preferably, the rear portion of the fish-eye should be coated with an absorbent material index matched to the contiguous material of the fish-eye in order to eliminate reflections from the rear surface of the fish-eye since such reflections would tend to degrade the image formed.

A hologram is formed from a fish-eye with an image within it as a result of an exposure to a scene as follows.

Radiation from a laser is split, with one portion caused to be incident on a photographic plate or other photosensitive material and the other portion used to illuminate the image in the fish-eye. Radiation scattered from the image is caused to interfere with the other radiation incident on the plate. The plate is thereby exposed to the resultant interference pattern. The exposure is processed if necessary to develop and fix the interference pattern which is a hologram of the original scene viewed by the fish-eye during its exposure.

Exposure of the fish-eye is a simple process whereas formation of the hologram is more difficult and requires more elaborate apparatus. However, formation of the hologram is performed subsequently to the exposure of the fish-eye to the scene in question, and can thus be carried out by, for example, a processing laboratory run by experts skilled in the art.

It should now be clear to those skilled in the art that the instant invention can be applied to a wide variety of equipment and many varieties of holograms can be formed by combination with the known art.

The invention will now be described with reference to the accompanying drawings, in which.

Figure 1:
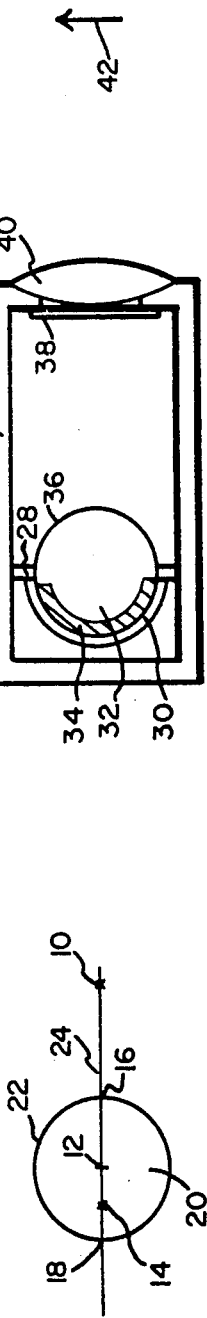
FIG. 1 is a schematic diagram illustrating the relations of object and image points with reference to a fish-eye.

In FIG. 1, the relation of an object point 10 exterior to and an image point 14 interior to a fish-eye 20 are shown in their relation to the center of spherical symmetry 12 for the refractive index of the fish-eye 20 and in their relation to the surface 22 of the fish-eye 20. It can be seen that the object point 10 and the image point 14 both lie on a line 24 which intersects the center of spherical symmetry 12 and the points 16, 18 lying on the surface 22 of the fish-eye.

Figure 2:
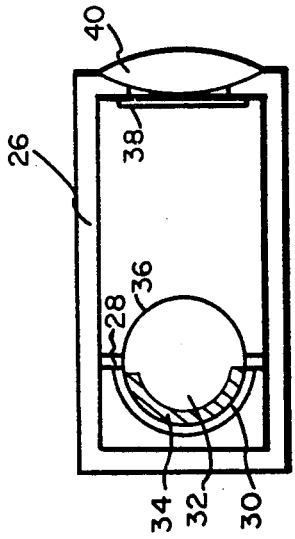
FIG. 2 is a schematic diagram illustrating an exemplary embodiment of a camera for use in the present invention.

The camera apparatus shown in FIG. 2 uses a fish-eye 32 mounted on supports 28 within an enclosure 26. The enclosure 26 admits light to the fish-eye 32 from an object 42 when the shutter 38 is opened, whereupon light coming from the object 42 passes via a lens 40 through the shutter 38 and is focused by the fish-eye 32 onto its image region of primary interest 34. Photochromic material is present in the embodiment shown in FIG. 2 only in a restricted region termed herein the image region of primary interest 34 in order to increase ease of manufacture as well as to decrease the time required for exposures. The combination of the focusing properties of the lens 40 and the fish-eye 32 is chosen so as to image objects of interest in the image region of primary interest 34. On that portion of the surface 36 of the fish-eye 32 opposite to the shutter 38, a layer of light-absorbing material 30 is present to reduce internal reflections within the fish-eye 32.

Figure 3:
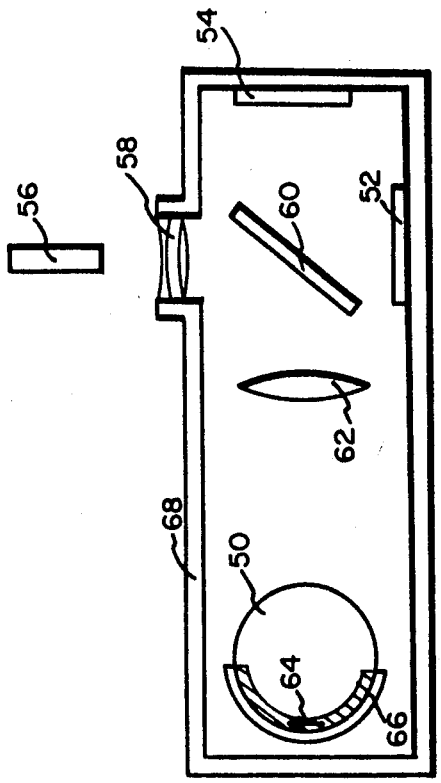
FIG. 3 is a schematic diagram illustrating the formation of a hologram in an exemplary embodiment of the present invention.

In FIG. 3, a particular embodiment is shown schematically of an apparatus which can produce a hologram 54 from an image 64 within a fish-eye 50. Radiation from a laser 56 passes into an enclosure 68 via a lens system 58 and is split by a beam splitter 60. One portion of the laser 56 radiation passes to a mirror 52 from which it is reflected and returns to the beam splitter 60 which reflects a portion of it towards a photographic plate 54 where it acts as a reference beam. The other portion of the laser 56 radiation split from the beam entering the enclosure 68 is reflected from the beam splitter 60 and passes via a lens 62 into the fish-eye 50 wherein it is partially reflected from an image 64 within the fish-eye and partially absorbed by an absorbent layer 66. Some of this radiation reflected by the image 64 passes via the lens 62 through the beam splitter 60 onto the photographic plate 54 where it interferes with the reference beam thus forming a holographic pattern characteristic of the image 64. Subjecting the photographic plate 54 to such subsequent processing as may be required to develop and fix this exposure can be carried out using known art. Thus, a hologram characteristic of the image 64 can be formed. One can print or replicate many types of holograms using known art.

It should be clear to those skilled in the art that bringing a reference beam from the rear rather than the front of the photographic plate or other photosensitive material used to form a hologram will produce a hologram that can be viewed by white light. Further, using more than one photosensitive material in the fish-eye can produce a multi-colored image which can be used to produce a color hologram. In addition, more than one fish-eye can be used to give more information about the original scene.

While the fish-eye has been shown located in air or the atmosphere, it could be submerged in other materials as well.

I claim:

1. A process for forming a hologram comprising:
   exposing a fish-eye lens included in an absolute instrument to radiation coming from some object;
   forming a stigmatic image with said absolute instrument of the object and recording said image on a layer of photochromic material affixed to said lens in the image plane of the instrument;
   removing said lens to a laser radiation station;
   illuminating the recorded stigmatic image with laser radiation;
   interfering radiation scattered from the stigmatic image with a reference beam; and
   exposing photosensitive material to the interfering radiation so as to form a hologram characteristic of the object.

2. The process of claim 1, including the steps of developing and fixing the stigmatic image formed by the absolute instrument.

3. The process of claim 1, including the steps of developing and fixing the exposure given to the photosensitive material.

4. The process of claim 2, including the step of subsequently removing said image from said photochromic material, whereby said material may be used again.

5. The process of claim 4, including the step of heating to remove said image.

6. The process of claim 4, including the step of optical bleaching to remove said image.

References Cited

UNITED STATES PATENTS 2,862,428  12/1958  Salter _____ 350—175

OTHER REFERENCES

Megla, "Optical Properties . . . Glass," Applied Optics, June 1966, vol. 5, No. 6, pp. 945–959 (350/3.5).

Fearing, "Breakthrough . . . Uses," Product Engineering, Feb. 13, 1967, pp. 28–31 (350/3.5).

DAVID SCHONBERG, Primary Examiner

PAUL A. SACHER, Assistant Examiner

U.S. Cl. X.R.

350—175